(12) United States Patent
David Sato

(10) Patent No.: US 7,990,627 B2
(45) Date of Patent: Aug. 2, 2011

(54) LENS DEVICE

(75) Inventor: Masumi David Sato, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/883,264

(22) Filed: Sep. 16, 2010

(65) Prior Publication Data

US 2011/0102921 A1 May 5, 2011

(30) Foreign Application Priority Data

Oct. 30, 2009 (JP) ................. P2009-251089

(51) Int. Cl.
  *G02B 15/14* (2006.01)
  *G02B 7/02* (2006.01)
(52) U.S. Cl. ...................... 359/700; 359/823
(58) Field of Classification Search ............. 359/811, 359/813, 815, 819, 822, 823, 826
  See application file for complete search history.

(56) References Cited

U.S. PATENT DOCUMENTS

| | | | |
|---|---|---|---|
| 6,853,499 B2 * | 2/2005 | Iwasaki | 359/694 |
| 2002/0135902 A1 | 9/2002 | Nomura et al. | |
| 2004/0130803 A1 * | 7/2004 | Iwasaki | 359/700 |
| 2007/0268596 A1 | 11/2007 | Aiba et al. | |
| 2009/0059390 A1 | 3/2009 | Koyama et al. | |

FOREIGN PATENT DOCUMENTS

| | | |
|---|---|---|
| EP | 1857850 A2 | 11/2007 |
| JP | 2007-310228 A | 11/2007 |

OTHER PUBLICATIONS

Extended European Search Report in European Application No. 10176854.7 and mailed Jan. 21, 2011.

* cited by examiner

*Primary Examiner* — Ricky L Mack
*Assistant Examiner* — Brandi N Thomas
(74) *Attorney, Agent, or Firm* — Birch, Stewart, Kolasch & Birch, LLP

(57) ABSTRACT

A second fixed cylinder includes a lens attachment portion having straight-ahead grooves provided therein and a guide groove arrangement portion having a first guide groove and a second guide groove provided therein. A second rotating cylinder rotatably supported by the second fixed cylinder includes a cam groove arrangement portion having cam grooves provided therein and a claw arrangement portion having a first claw portion (third claw portion) fitted to the first guide groove and a second claw portion fitted to the second guide groove. The first guide groove and the second guide groove are arranged so as to deviate from each other in the axial direction. Therefore, the operation range of the second rotating cylinder is not regulated by the movement range of the first claw portion, and a wide operation range of the second rotating cylinder is ensured.

9 Claims, 7 Drawing Sheets

LENS DEVICE

CROSS-REFERENCE TO RELATED APPLICATIONS

This application is based upon and claims the benefit of priority from the Japanese Patent Application No. 2009-251089 filed on Oct. 30, 2009; the entire contents of which are incorporated herein by reference.

BACKGROUND OF THE INVENTION

1. Field of the Invention

The present invention relates to a lens device and more particularly, to the structure of an operating member used to move a moving lens in the optical axis direction.

2. Description of the Related Art

In recent years, monitoring cameras have been installed in, for example, financial institutions or stores where merchandise is offered for sale. The monitoring camera is attached to the ceiling or wall of an installation site, such as an entrance or an elevator. After the monitoring camera is installed at a predetermined position, for example, a zoom lens or a focus lens is adjusted according to the installation environment.

JP-A-2007-310228 (corresponding to US-A-2007/0268596) discloses a monitoring camera in which an operation ring for focusing and an operation ring for zooming are provided on the object side of the camera and the focusing and zooming operations are performed after the camera is installed. In this way, the operability of the monitoring camera is improved.

With an improvement in the performance of image sensors applied to the monitoring cameras (with an increase in the number of pixels), the purpose of the monitoring camera has been changed from the recording of images to the recognition of the details of images. When the number of pixels of the image sensor increases, a delicate operation is required for zooming or focusing. As a result, it is difficult to perform the zooming or focusing operation and it takes a long time to perform the zooming or focusing operation.

Here, an example of the structure according to the related art that moves a moving lens, such as a zoom lens or a focus lens, will be described. FIG. 7 is a plane development diagram schematically illustrating the structure of a lens barrel 200 (a moving lens is supported so as to be movable in the optical axis direction and an operating member used to move the moving lens is attached to the lens barrel) according to the related art.

FIG. 7 shows a lens supporting portion of the lens barrel and an attachment portion of the operating member. As shown in FIG. 7, three straight-ahead grooves 204A, 204B, and 204C are provided in the outer circumferential surface 202 of the lens barrel (fixed cylinder) 200 in parallel to the optical axis direction. The three straight-ahead grooves 204A, 204B, and 204C are arranged at equal intervals of 120° in the circumferential direction of the fixed cylinder 200. Three pins 206A, 206B, and 206C that are arranged at equal intervals of 120° on the outer circumferential portion of a lens frame (not shown) to which the moving lens is fixed are fitted to the three straight-ahead grooves 204A, 204B, and 204C. The three pins 206A, 206B, and 206C are also fitted to spiral cam grooves 208A, 208B, and 208C (represented by a one-dot chain line in FIG. 7) that are provided in the inner circumferential surface of the operating member (a rotating cylinder attached to the outer circumferential surface of the fixed cylinder 200; not shown).

In the lens device having the above-mentioned structure, when the rotating cylinder is rotated with respect to the fixed cylinder 200 to move the cam grooves 208A, 208B, and 208C in the vertical direction of FIG. 7, the pins 206A, 206B, and 206C are moved along the intersections of the straight-ahead grooves 204A, 204B, and 204C and the cam grooves 208A, 208B, and 208C, respectively. In this way, it is possible to move the moving lens forward or backward in parallel to the optical axis direction, which is the left-right direction of FIG. 7.

As a structure for regulating the movement range of the rotating cylinder, an opening 210 with a predetermined length is provided in the outer circumferential surface of the rotating cylinder along the circumferential direction, and a rotation regulating pin 212 is inserted into the groove provided in the outer circumferential surface of the fixed cylinder 200 through the opening 210. The amount of rotation of the rotating cylinder is regulated by the length of the opening 210 in the circumferential direction, and the rotation regulating pin 212 is fitted to the fixed cylinder 200 to fix the relative position (lens position) between the fixed cylinder 200 and the rotating cylinder.

Guide grooves 214A, 214B, and 214C are provided in the outer circumferential surface 202 of the fixed cylinder 200 at equal intervals of 120° in the circumferential direction so as to correspond to the straight-ahead grooves 204A, 204B, and 204C. The guide grooves 214A, 214B, and 214C regulate the movement of the rotating cylinder in the axial direction when the rotating cylinder is fitted to the fixed cylinder 200 and are used to determine the positions of the rotating cylinder and the fixed cylinder 200 when the rotating cylinder is fitted to the fixed cylinder 200. Pins (claw portions hatched in FIG. 7) 216A, 216B, and 216C that are provided on the inner circumferential surface of the rotating cylinder are fitted to the guide grooves 214A, 214B, and 214C to determine the positions of the rotating cylinder and the fixed cylinder 200 when the rotating cylinder is fitted to the fixed cylinder 200.

However, in the adjustment structure of the moving lens shown in FIG. 7, it is difficult to widen the movement range of the rotating cylinder to be equal to or more than the length of the guide grooves 214A, 214B, and 214C of the fixed cylinder 200 in the circumferential direction. The movement range of the rotating cylinder is determined by the fitting of the rotation regulating pin 212 to the opening 210, not the fitting of the pins 216A, 216B, and 216C to the guide grooves 214A, 214B, and 214C. Therefore, it is necessary to provide a clearance between both ends of each of the guide grooves 214A, 214B, and 214C such that the pins 216A, 216B, and 216C do not collide with the guide grooves 214A, 214B, and 214C.

For example, in the case of the guide groove 214B, the movement range of the rotating cylinder is from the position of the pin 216B to the position of a pin 216B', and the limit of the angle of the movement range is equal to or less than 100°. In fact, the limit of the angle is in the range of 60° to 80°.

As such, the amount of operation of the rotating cylinder needs to be very small in order to finely move the moving lens under the conditions where the movement range of the rotating cylinder is regulated. As a result, it is very difficult to perform a zooming or focusing operation. When the size of the lens device is reduced, it is more difficult to perform the zooming or focusing operation of finely moving the moving lens. In order to change the movement range of the moving lens, the overall design of the lens needs to be reexamined. Therefore, it is difficult to change the movement range of the moving lens. Thus, it is preferable to facilitate the zooming or focusing operation without changing the movement range of the moving lens. In this case, even though the movement range of the rotating cylinder is wide and the amount of operation of the rotating cylinder is large, a structure with a small amount of lens movement may facilitate the zooming or focusing operation.

SUMMARY OF THE INVENTION

The invention has been made in order to solve the above-mentioned problems and an object of the invention is to provide a lens device capable of ensuring a wide operable range of an operating member used to move a moving lens and simplifying the adjustment of the fine movement of the moving lens.

According to a first aspect of the invention, a lens device includes: a moving lens that is fixed to a lens frame having a plurality of protruding portions provided on an outer circumferential portion thereof; a barrel that has a cylindrical shape and includes a moving lens holding portion and a guide groove arrangement portion; and a rotating cylinder that has a cylindrical shape corresponding to the barrel, is supported so as to be rotatable with respect to the barrel, and includes a cam groove arrangement portion and a claw arrangement portion. The moving lens holding portion includes straight-ahead grooves that correspond to the plurality of protruding portions and are provided in parallel to the axial direction so as to pass through the moving lens holding portion from an outer circumferential surface to the inside. The protruding portions are fitted to the straight-ahead grooves from the inside to hold the moving lens such that the moving lens is movable along the axial direction. The guide groove arrangement portion includes a first guide groove that is provided in the circumferential direction and a second guide groove that is provided in the circumferential direction so as to deviate from the first guide groove in the axial direction. The cam groove arrangement portion includes cam grooves, which have a predetermined trajectory and to which the plurality of protruding portions protruding from the outer circumferential surface of the barrel are fitted, provided in the inner circumferential surface thereof. The claw arrangement portion includes a first claw portion fitted to the first guide groove and a second claw portion fitted to the second guide groove. The first claw portion and the second claw portion are arranged at a predetermined interval in the circumferential direction such that they deviate from each other in axial direction.

According to the above-mentioned aspect, the first guide groove and the second guide groove used to determine the positions of the rotating cylinder and the barrel are arranged so as to deviate from each other in the axial direction. Therefore, it is possible to ensure the first guide groove and the second guide groove with a long length in the circumferential direction without any regulation between the first guide groove and the second guide groove.

Therefore, it is possible to widen the movable range of the first and second claw portions according to the lengths of the first and second guide grooves, and the operable range of the rotating cylinder is not regulated by the movable range of the first and second claw portions, which facilitates the operation of the rotating cylinder for finely moving the moving lens.

In order to obtain a good operation feeling regarding the rotating cylinder, it is preferable that an elastic member acting so as to separate the barrel from the rotating cylinder in the axial direction be provided between the barrel and the rotating cylinder.

According to a second aspect of the invention, in the lens device according to the first aspect, the barrel may have a structure in which the first guide groove and the second guide groove have different depths. The rotating cylinder may have a shape in which the heights of the first claw portion and the second claw portion are different from each other so as to correspond to the depths of the first guide groove and the second guide groove.

According to the above-mentioned aspect, it is possible to prevent an error in the insertion of the first and second claw portions and accurately position the barrel and the rotating cylinder when the barrel and the rotating cylinder are fitted to each other.

It is preferable that the depth of the guide groove on the front side in the fitting direction when the barrel and the rotating cylinder fitted to each other be more than that of the guide groove on the rear side.

According to a third aspect of the invention, in the lens device according to the first or second aspect, the barrel may have a structure in which the length of the first guide groove and the second guide groove in the circumferential direction is more than the gap between the straight-ahead grooves.

According to the above-mentioned aspect, it is possible to widen the movement range of the first and second claw portions to be more than the gap between the straight-ahead grooves. Therefore, the operable range of the rotating cylinder is not regulated by the gap between the straight-ahead grooves.

According to a fourth aspect of the invention, in the lens device according to any one of the first to third aspects, the rotating cylinder may further include a third claw portion that is provided substantially at the same position as the first claw portion in the axial direction, is arranged with a predetermined gap from the first claw portion and the second claw portion in the circumferential direction, and is fitted to the first rotation groove.

According to the above-mentioned aspect, the rotating cylinder is supported at three points in the circumferential direction. Therefore, the rotating cylinder is stably supported with respect to the barrel.

According to a fifth aspect of the invention, in the lens device according to the fourth aspect, the barrel may have a structure in which the first guide groove has a step portion and portions of the first guide groove before and after the step portion have different depths. The rotating cylinder may have a structure in which the heights of the first claw portion and the third claw portion are different from each other so as to correspond to the depth of the first guide groove.

According to the above-mentioned aspect, the position where the first claw portion and the third claw portion are fitted in the first guide groove is determined.

For example, the third claw portion is higher than the first claw portion. The first claw portion is fitted to a shallow portion of the first guide groove and the third claw portion is fitted to a deep portion of the first guide groove.

According to a sixth aspect of the invention, in the lens device according to the fourth or fifth aspect, the rotating cylinder may have a structure in which the first and second claw portions and the third claw portion are arranged substantially at equal intervals in the circumferential direction.

According to the above-mentioned aspect, a stable operation torque is obtained in the circumferential direction of the rotating cylinder. Therefore, the operability of the rotating cylinder is improved.

According to a seventh aspect of the invention, in the lens device according to any one of the first to sixth aspects, a fixed lens may be attached to the front side of the barrel such that the optical axis of the fixed lens is aligned with that of the moving lens.

It is preferable that a structure for attaching the fixed lens be provided on the front side of the barrel.

According to an eighth aspect of the invention, in the lens device according to the seventh aspect, an iris device may be attached to the front side of the fixed lens of the barrel.

It is preferable that a structure for attaching the iris device be provided on the front side of the barrel.

According to a ninth aspect of the invention, in the lens device according to the eighth aspect, a second barrel having a structure in which a fixed lens is attached to the foremost surface and a moving lens is attached to the rear side of the fixed lens such that the optical axis of the moving lens is aligned with that of the fixed lens may be attached to the front side of the iris device of the barrel.

It is preferable that the front moving lens be a zoom lens and the rear moving lens be a focus lens.

According to the above-mentioned aspects of the invention, the first guide groove and the second guide groove used to position the barrel and the rotating cylinder when the barrel and the rotating cylinder are fitted to each other are arranged so as to deviate from each other in the axial direction. Therefore, it is possible to ensure the first guide groove and the second guide groove with a long length in the circumferential direction without any regulation between the first guide groove and the second guide groove.

Therefore, it is possible to widen the movable range of the first and second claw portions according to the lengths of the first and second guide grooves, and the operable range of the rotating cylinder is not regulated by the movable range of the first and second claw portions, which facilitates the operation of the rotating cylinder for finely moving the moving lens.

DESCRIPTION OF THE PREFERRED EMBODIMENTS

Hereinafter, a lens device according to an exemplary embodiment of the invention will be described in detail with reference to the accompanying drawings.

<Overall Structure>

Figure 1:
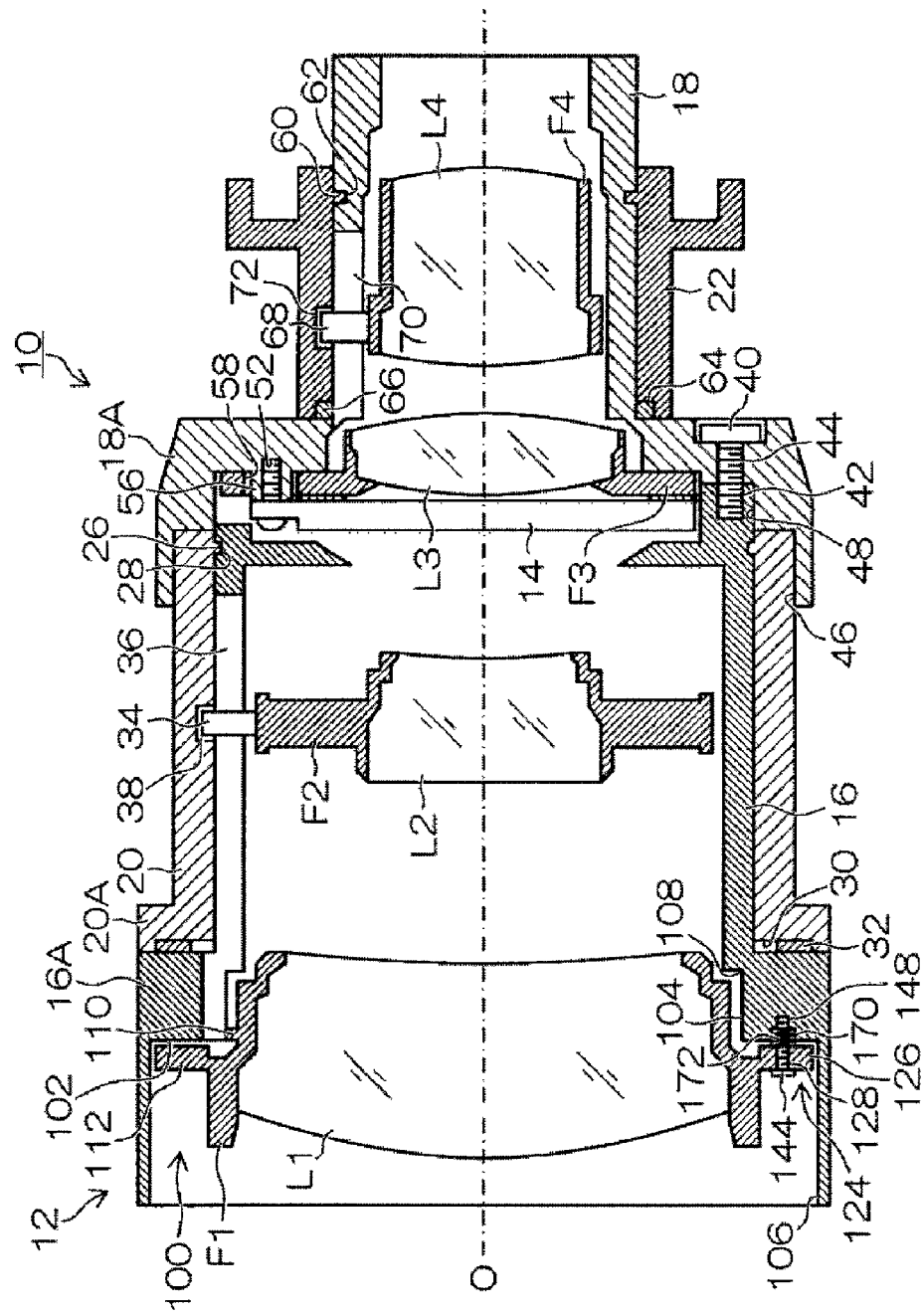
FIG. 1 is a cross-sectional view illustrating a lens device according to an embodiment of the invention.

FIG. 1 is a cross-sectional view illustrating a lens device according to an embodiment of the invention.

A lens device 10 shown in FIG. 1 is for a monitoring camera including a focus mechanism, a zoom mechanism, and an iris mechanism. A first lens L1, a second lens L2, a third lens L3, and a fourth lens L4 are arranged in a lens barrel 12 in this order from the front side along the imaging optical axis O. An iris device 14 is provided between the second lens L2 and the third lens L3.

In FIG. 1, each of the lenses L1 to L4 is a single lens. However, in practice, each of the lenses L1 to L4 includes at least one lens.

The first lens L1 and the third lens L3 are fixed lenses and are respectively held by lens holding frames F1 and F3 so as to be fixed and attached to predetermined positions in the lens barrel 12.

The second lens L2 and the fourth lens L4 are moving lenses. The second lens L2 and the fourth lens L4 are respectively held by lens holding frames F2 and F4 and are attached so as to be movable forward or backward along the imaging optical axis O in the lens barrel 12. The lens device 10 moves the second lens L2 to perform a zooming operation and moves the fourth lens L4 to perform a focusing operation.

The lens barrel 12 mainly includes a first fixed cylinder 16, a second fixed cylinder 18 that is coaxially connected to the rear end of the first fixed cylinder 16, a first rotating cylinder 20 that is rotatably provided on an outer circumferential portion of the first fixed cylinder 16, and a second rotating cylinder 22 that is rotatably provided on an outer circumferential portion of the second fixed cylinder 18.

The first fixed cylinder 16 has a cylindrical shape and has a flange portion 16A formed in the outer circumference of the leading end. A lens attachment portion 100 is formed in the inner circumference of the leading end of the first fixed cylinder 16, and the first lens L1 is attached to the lens attachment portion 100. The attachment structure of the first lens L1 will be described in detail below.

The first rotating cylinder 20 has a cylindrical shape and has a flange portion 20A formed in the outer circumference of the leading end. The inside diameter of the first rotating cylinder 20 corresponds to the outside diameter of the first fixed cylinder 16. The inner circumferential portion of the first rotating cylinder 20 is fitted to the outer circumferential portion of the first fixed cylinder 16 and is supported such that it can slide on the outer circumferential portion of the first fixed cylinder 16.

Three pins 26 are formed at the rear end of the inner circumferential portion of the first rotating cylinder 20 in the circumferential direction so as to protrude therefrom. The three pins 26 are fitted to a guide groove 28 that is formed at the rear end of the outer circumferential portion of the first fixed cylinder 16 in the circumferential direction. The movement of the first rotating cylinder 20 in the axial direction is regulated by the three pins 26 fitted to the guide groove 28 and the first rotating cylinder 20 is supported so as to be rotatable around the outer circumferential portion of the first fixed cylinder 16.

A ring-shaped concave portion 30 with a predetermined inside diameter which has the imaging optical axis O as its center is formed in the leading end surface of the first rotating cylinder 20. A wavy spring 32 having a ring shape is fitted to the concave portion 30. When the first rotating cylinder 20 is fitted to the outer circumferential portion of the first fixed cylinder 16, the wavy spring 32 comes into contact with the rear end surface of the flange portion 16A of the first fixed cylinder 16 and urges the flange portions 16A and 20A such that they are separated from each other in the axial direction. In this way, when the first rotating cylinder 20 is rotated, a predetermined torque is generated, thereby giving a good operation feeling.

The second lens L2 is accommodated in the inner circumferential portion of the first fixed cylinder 16. Three cam pins 34 are arranged at equal intervals (intervals of 120°) on the outer circumferential portion of the lens holding frame F2 holding the second lens L2. Three straight-ahead grooves 36 to which the three cam pins 34 are individually fitted are formed in the circumferential surface of the first fixed cylinder 16 in parallel to the imaging optical axis O. In addition, three cam grooves 38 to which the three cam pins 34 are individually fitted are formed in the inner circumferential surface of the first rotating cylinder 20 in a predetermined trajectory. The second lens L2 is accommodated in the inner circumferential portion of the first fixed cylinder 16, with the three cam pins 34 fitted to the three straight-ahead grooves 36 formed in the first fixed cylinder 16 and the three cam grooves 38 formed in the inner circumferential surface of the first rotating cylinder 20. In this way, when the first rotating cylinder 20 is rotated, the second lens L2 is moved forward or backward along the imaging optical axis O by the action of the three cam pins 34, the cam grooves 38, and the straight-ahead grooves 36.

The second fixed cylinder 18 has a cylindrical shape and includes a flange portion 18A formed in the outer circumference of the leading end. The second fixed cylinder 18 is coaxially connected to the rear end of the first fixed cylinder 16 by fixing the flange portion 18A to the rear end surface of the first fixed cylinder 16 with barrel fixing screws 40. Therefore, screw holes 42 for the barrel fixing screws 40 are formed in the rear end surface of the first fixed cylinder 16 in parallel to the imaging optical axis O, and holes 44 for the barrel fixing screws 40 are formed in the flange portion 18A of the second fixed cylinder 18 so as to pass through it in parallel to the imaging optical axis O. Three screw holes 42 and three holes 44 are arranged at equal intervals on a concentric circle having the imaging optical axis O as its center. The second fixed cylinder 18 is screwed and fixed to the rear end surface of the first fixed cylinder 16 at three points.

A first fitting portion 46 and a second fitting portion 48 are formed in the leading end surface of the second fixed cylinder 18. The first fitting portion 46 is formed as an annular concave portion having the imaging optical axis O as its center, and the inside diameter of the first fitting portion 46 corresponds to the outside diameter of the first rotating cylinder 20. The second fitting portion 48 is formed as an annular concave portion having the imaging optical axis O as its center in the bottom of the first fitting portion 46, and the inside diameter of the second fitting portion 48 corresponds to the outside diameter of the first fixed cylinder 16. As a result, when the second fixed cylinder 18 is connected to the first fixed cylinder 16, the rear end portion of the first fixed cylinder 16 is fitted to the inside of the second fitting portion 48 and the rear end portion of the first rotating cylinder 20 is fitted to the inside of the first fitting portion 46.

The third lens L3 is fitted to the inside of the second fitting portion 48. When the second fixed cylinder 18 is connected to the first fixed cylinder 16, the lens holding frame F3 is interposed between the rear end surface of the first fixed cylinder 16 and the bottom of the second fitting portion 48 and is fixed to a predetermined position.

In order to reliably fix the lens holding frame F3, a ring-shaped spring member is provided between the lens holding frame F3 and the rear end surface of the first fixed cylinder 16. The spring member presses the lens holding frame F3 against the bottom of the second fitting portion 48.

In order to attach the third lens L3 without being inclined, the rear surface of the lens holding frame F3 of the third lens L3 and the bottom of the second fitting portion 48 are orthogonal to the imaging optical axis O. In this way, when the rear surface of the lens holding frame F3 of the third lens L3 and the bottom of the second fitting portion 48 contact each other, the third lens L3 is arranged orthogonal to the imaging optical axis O.

Bosses (not shown) are provided at two points on the bottom of the second fitting portion 48 so as to protrude in the optical axis direction, and boss holes to which the bosses are fitted are formed in the rear end surface of the lens holding frame F3 of the third lens L3. The third lens L3 is fitted to the second fitting portion 48 by fitting the bosses to the boss holes. In this way, the third lens L3 is positioned and attached.

The iris device 14 is attached to the bottom of the second fitting portion 48 by screws 50. Therefore, screw holes 52 for the screws 50 are formed in the bottom of the second fitting portion 48 in parallel to the imaging optical axis O, and holes (not shown) for the screws 50 are formed in the iris device 14 so as to pass through it in parallel to the imaging optical axis O. Two screw holes 52 and two holes are formed at equal intervals on a concentric circle having the imaging optical axis O as its center, and the iris device 14 is screwed and fixed to the bottom of the second fitting portion 48 at two points.

The screw hole 52 formed in the second fitting portion 48 is provided in a cylindrical protruding portion 56 that protrudes from the bottom of the second fitting portion 48 in parallel to the imaging optical axis O. An insertion hole 58 through which the protruding portion 56 is inserted is formed in the lens holding frame F3 of the third lens L3 in parallel to the imaging optical axis O. The third lens L3 is fitted to the second fitting portion 48 by inserting the protruding portion 56 into the insertion hole 58.

The second rotating cylinder 22 has a cylindrical shape and the inside diameter of the second rotating cylinder 22 corresponds to the outside diameter of the second fixed cylinder 18. The inner circumferential portion of the second rotating cylinder 22 is fitted to the outer circumferential portion of the second fixed cylinder 18. In this way, the second rotating cylinder 22 is supported so as to be slidable on the outer circumferential portion of the second fixed cylinder 18.

Three pins 60 (corresponding to a first claw portion 60A, a second claw portion 60B, and a third claw portion 60C, which will be described below) are formed at the rear end of the inner circumferential portion of the second rotating cylinder 22 in the circumferential direction so as to protrude therefrom. The three pins 60 are fitted to guide grooves 62 (corresponding to a first guide groove 62A, a second guide groove 62B, and a third guide groove 62C, which will be described below) that are formed at the rear end of the outer circumferential portion of the second fixed cylinder 18 in the circumferential direction. The movement of the second rotating cylinder 22 in the axial direction is regulated by the three pins 60 fitted to the guide grooves 62 and the second rotating cylinder 22 is supported so as to be rotatable around the outer circumferential portion of the second fixed cylinder 18.

A ring-shaped concave portion 64 is formed in the leading end surface of the second rotating cylinder 22 in the circumferential direction. A wavy spring 66 having a ring shape is fitted to the concave portion 64. When the second rotating cylinder 22 is fitted to the outer circumferential portion of the second fixed cylinder 18, the wavy spring 66 comes into contact with the rear end surface of the flange portion 18A of the second fixed cylinder 18 and urges the second rotating cylinder 22 in a direction in which the second rotating cylinder 22 is separated from the flange portion 18A of the second fixed cylinder 18. In this way, when the second rotating cylinder 22 is rotated, a predetermined torque is generated to give a good operation feeling.

The fourth lens L4 is accommodated in the inner circumferential portion of the second fixed cylinder 18. Three cam pins 68 are arranged at equal intervals (intervals of 120°) on the outer circumferential portion of the lens holding frame F4 holding the fourth lens L4. Three straight-ahead grooves 70 to which the three cam pins 68 are individually fitted are formed in the circumferential surface of the second fixed cylinder 18 in parallel to the imaging optical axis O. In addition, three cam grooves 72 to which the three cam pins 68 are individually fitted are formed in the inner circumferential surface of the second rotating cylinder 22 in a predetermined trajectory. The fourth lens L4 is accommodated in the inner circumferential portion of the second fixed cylinder 18, with the three cam pins 68 fitted to the three straight-ahead grooves 70 formed in the second fixed cylinder 18 and the three cam grooves 72 formed in the inner circumferential surface of the second rotating cylinder 22. In this way, when the second rotating cylinder 22 is rotated, the fourth lens L4 is moved forward or backward along the imaging optical axis O by the action of the three cam pins 68, the cam grooves 72, and the straight-ahead grooves 70.

In the lens device 10 having the above-mentioned structure, when the first rotating cylinder 20 is rotated, the second lens L2 is moved forward or backward on the imaging optical axis O according to the amount of rotation. As a result, a zooming operation is performed. In addition, when the second rotating cylinder is rotated, the fourth lens L4 is moved forward or backward on the imaging optical axis O according to the amount of rotation. As a result, a focusing operation is performed.

An imaging unit (not shown) is attached to the rear end portion of the lens device 10. Light incident on the first lens L1 passes through the second lens L2, the iris device 14, the third lens L3, and the fourth lens L4 and is then incident on a light receiving surface of an imaging device provided in the imaging unit.

<Attachment Structure of Fourth Lens L4>

Figure 2:
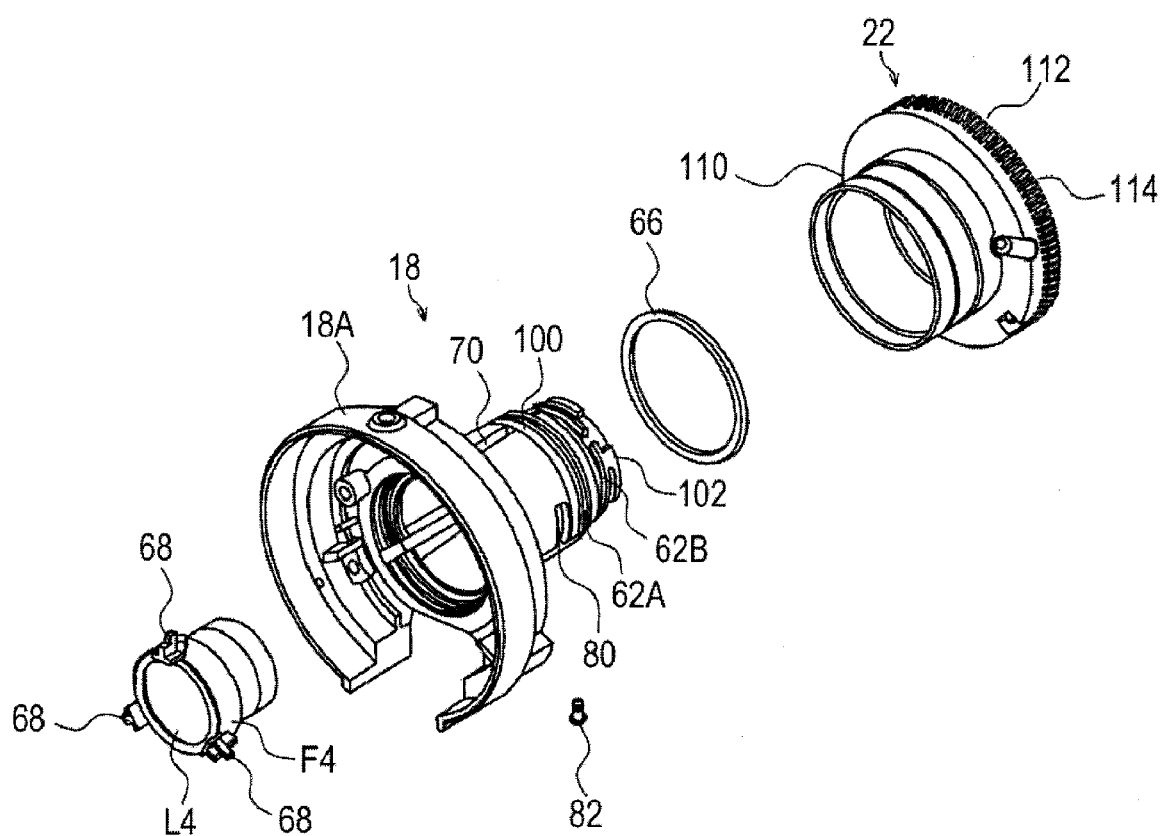
FIG. 2 is an assembly development diagram illustrating a fourth lens.

Next, the attachment structure of the fourth lens will be described. FIG. 2 is an assembly development diagram illustrating the fourth lens L4. As shown in FIG. 2, the second fixed cylinder 18 has a lens attachment portion 100 provided on the rear side of the flange portion 18A. The lens attachment portion 100 includes three straight-ahead grooves 70 for supporting the fourth lens L4 so as to be movable and rotation regulating grooves 80 which regulate the rotation of the second rotating cylinder 22 with respect to the second fixed cylinder 18 and into which pins (which are not shown in FIG. 2, but are represented by reference numeral 80 in FIG. 4) for fixing the second rotating cylinder 22 to the second fixed cylinder 18 are inserted.

The second fixed cylinder 18 includes a guide groove arrangement portion 102 provided on the rear side of the lens attachment portion 100. The guide groove arrangement portion 102 includes a first guide groove 62A and a second guide groove 62B provided in the outer circumferential portion thereof along the circumferential direction. The first guide groove 62A and the second guide groove 62B shown in FIG. 2 correspond to the guide grooves 62 shown in FIG. 1.

The second rotating cylinder 22 has a cylindrical shape having the inner circumference corresponding to the second fixed cylinder 18. The second rotating cylinder 22 includes a cam groove arrangement portion 110 that has cam grooves 72 (not shown in FIG. 2; see FIGS. 1 and 4) with a predetermined trajectory corresponding to the straight-ahead grooves 70 of the second fixed cylinder 18 provided in the inner circumferential surface thereof and a claw arrangement portion 112 that is provided on the rear side of the cam groove arrangement portion 110 and has three claw portions (which are not shown in FIG. 2, but are represented by reference numerals 60A to 60C in FIGS. 5 and 6) provided on the inner circumferential surface thereof so as to protrude therefrom. The three claw portions are fitted to the first guide groove 62A and the second guide groove 62B of the second fixed cylinder 18. The three claw portions provided on the inner circumferential surface of the claw arrangement portion 112 correspond to the pins 60 shown in FIG. 1.

The cam groove arrangement portion 110 and the claw arrangement portion 112 are concentric cylinders, and the radius of the claw arrangement portion 112 is more than that of the cam groove arrangement portion 110. In addition, an uneven portion 114 is provided on the outer circumferential surface of the claw arrangement portion 112. This structure makes it easy for the operator to operate the second rotating cylinder 22.

Figure 4:
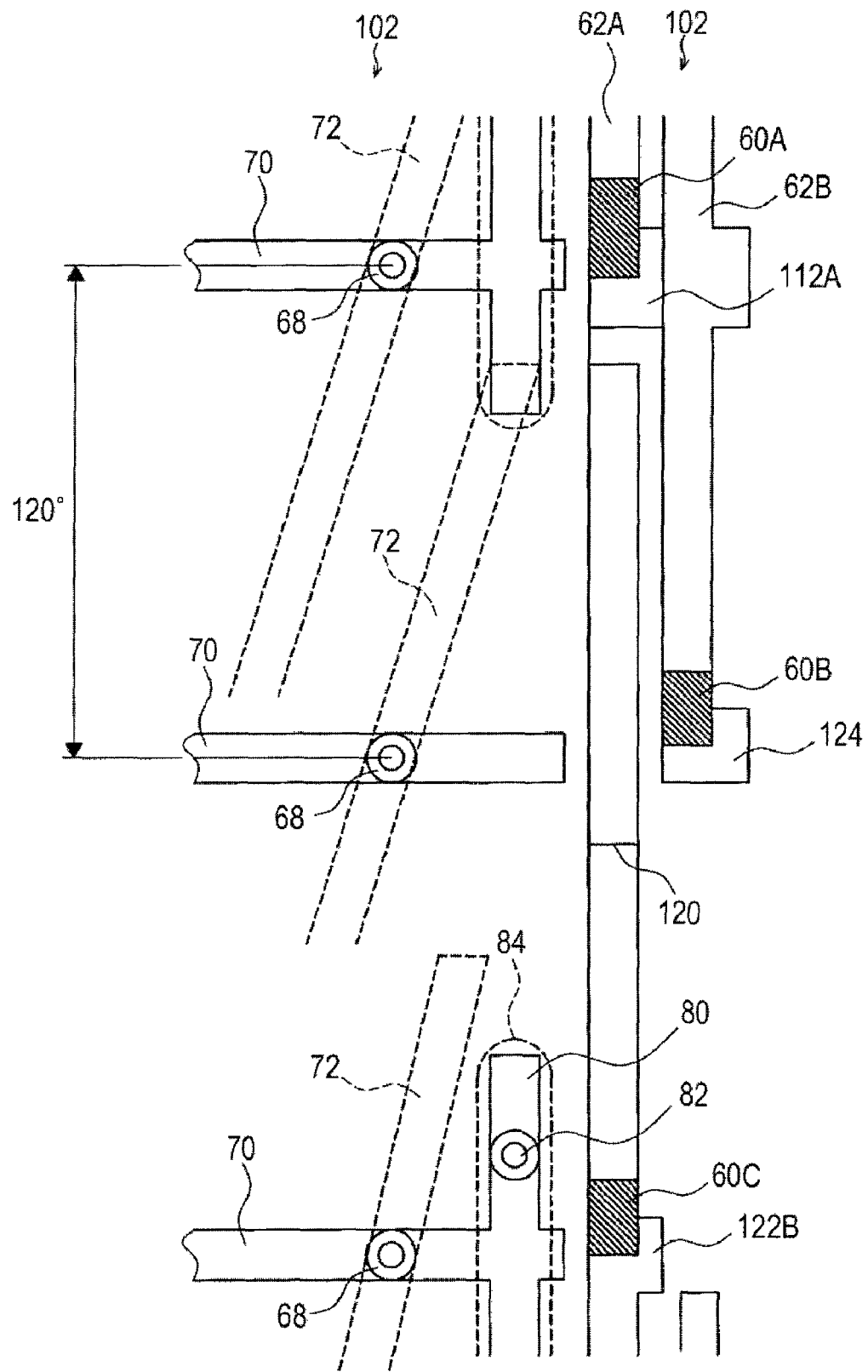
FIG. 4 is a plane development diagram illustrating the second fixed cylinder.

Although not shown in FIG. 2, long circular openings (which are represented by a dashed line with reference numeral 84 in FIG. 4) having a predetermined length in the circumferential direction are provided in the cam groove arrangement portion 110 of the second rotating cylinder 22 at positions corresponding to the positions of the rotation regulating groove 80 provided in the second fixed cylinder 18.

The wavy spring 66 is inserted from the front side of the second rotating cylinder 22 having the above-mentioned structure, and the second rotating cylinder 22 is positioned and fitted from the rear side of the second fixed cylinder 18. With the second rotating cylinder 22 fitted to the second fixed cylinder 18, the fourth lens L4 is inserted from the front side of the second fixed cylinder 18.

After the fourth lens L4 is accommodated, fixing screws 82 are inserted into the rotation regulating grooves 80 provided in the outer circumferential surface of the lens attachment portion 100 of the second fixed cylinder 18 through the openings of the second rotating cylinder 22.

The fixing screw 82 is tightened to fix the fourth lens L4 after the lens device 10 (see FIG. 1) is provided at a predetermined position and the position of the fourth lens L4 is adjusted.

The wavy spring 66 inserted between the second fixed cylinder 18 and the second rotating cylinder 22 may act to separate the second fixed cylinder 18 from the second rotating cylinder 22, thereby generating torque for operating the second rotating cylinder 22. For example, the wavy spring 66 may have a structure in which elastic members are adhered to the front and rear surfaces of a metal or resin plate.

Figure 3:
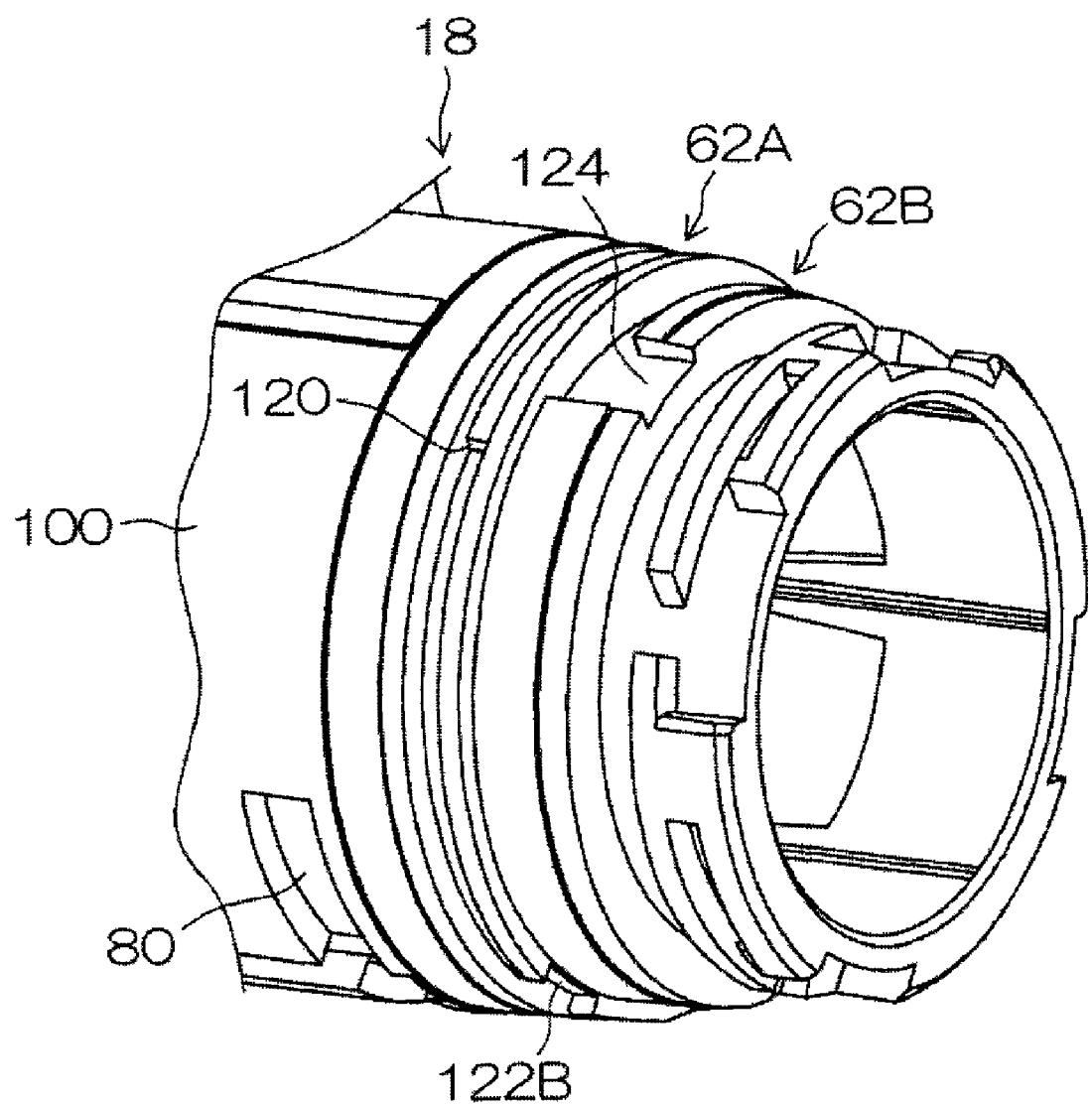
FIG. 3 is a partial enlarged view illustrating a second fixed cylinder.

FIG. 3 is an enlarged view illustrating the guide groove arrangement portion 102 of the second fixed cylinder 18. FIG. 4 is a development diagram illustrating the cam groove arrangement portion 110 and the claw arrangement portion 112 of the second fixed cylinder 18.

The first guide groove 62A is provided on the front side (a side close to the lens attachment portion 100) of the guide groove arrangement portion 102, and the second guide groove 62B is provided on the rear side thereof. The first guide groove 62A has a length substantially over the entire circumference of the guide groove arrangement portion 102 and has a structure in which portions before and after a step portion 120 have different depths (a portion below the step portion 120 in FIG. 3 is a "deep portion" and a portion above the step portion 120 is a "shallow portion").

An insertion portion (cut-out portion) 122A (not shown in FIG. 3) into which the first claw portion 60A (a hatched portion in FIG. 4) of the second fixed cylinder 18 is inserted and an insertion portion 122B into which the third claw portion 60C (a hatched portion in FIG. 4) is inserted are provided in the first guide groove 62A.

The insertion portion 122A is provided in the shallow portion of the first guide groove 62A so as to correspond to the height (see FIGS. 5 and 6) of the first claw portion 60A. The insertion portion 122B is provided in the shallow portion of the first guide groove 62A so as to correspond to the height (see FIGS. 5 and 6) of the third claw portion 60C. According to this structure, it is possible to prevent an error in the insertion of the first claw portion 60A and the third claw portion 60C when the second rotating cylinder 22 is fitted to the second fixed cylinder 18 and thus accurately determine the positions of the second rotating cylinder 22 and the second fixed cylinder 18.

The second guide groove 62B provided on the rear side of the first guide groove 62A is arranged below the first guide groove 62A. The second claw portion 60B (a hatched portion in FIG. 4) provided on the second rotating cylinder 22 is fitted to the second guide groove 62B. An insertion portion 124 having a depth corresponding to the height (see FIGS. 5 and 6) of the second claw portion 60B and a width corresponding to the width (see FIGS. 5 and 6) of the second claw portion 60B is provided. Since the width of the insertion portion 124 is smaller than those of the insertion portions 122A and 122B provided in the first guide groove 62A, the insertion of the first claw portion 60A or the third claw portion 60C into the second guide groove 62B through the insertion portion 124 is prevented.

The second guide groove 62B has at least a length more than the gap between the straight-ahead grooves 70 in the circumferential direction. The second guide groove 62B shown in FIGS. 3 and 4 has a length corresponding to two pitches (about) 240° of the straight-ahead groove 70 in the circumferential direction of the second rotating cylinder 22.

Figure 7:
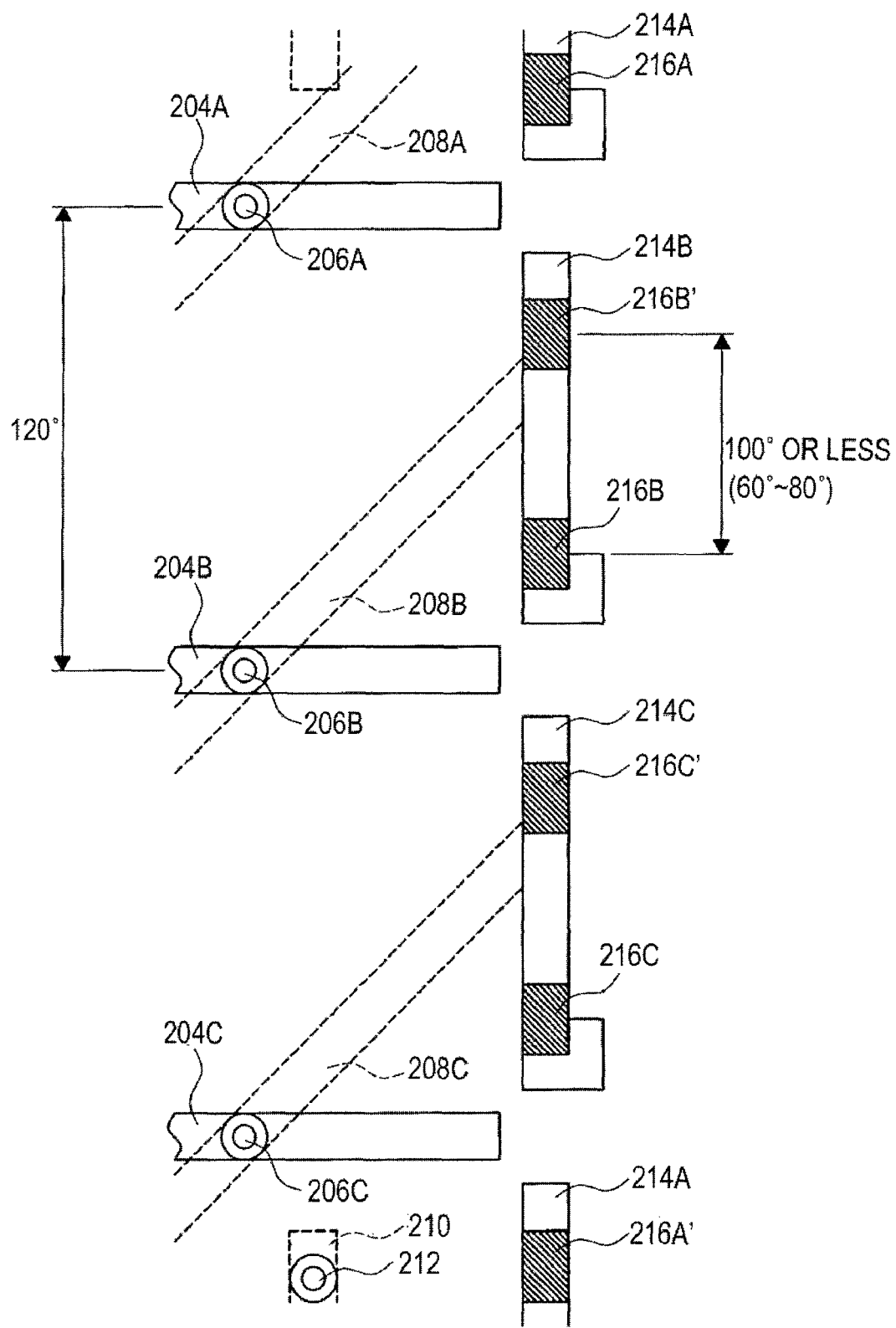
FIG. 7 is a diagram illustrating an example of the structure of a lens barrel (lens device) according to the related art.

That is, the first guide groove 62A and the second guide groove 62B used to determine the positions of the second fixed cylinder 18 and the second rotating cylinder 22 are arranged so as to deviate from each other in the axial direction. Therefore, the guide grooves do not regulate their lengths in the circumferential direction. As a result, it is possible to increase the lengths of the first guide groove 62A and the second guide groove 62B in the circumferential direction, as compared to the example shown in FIG. 7.

Figure 5:
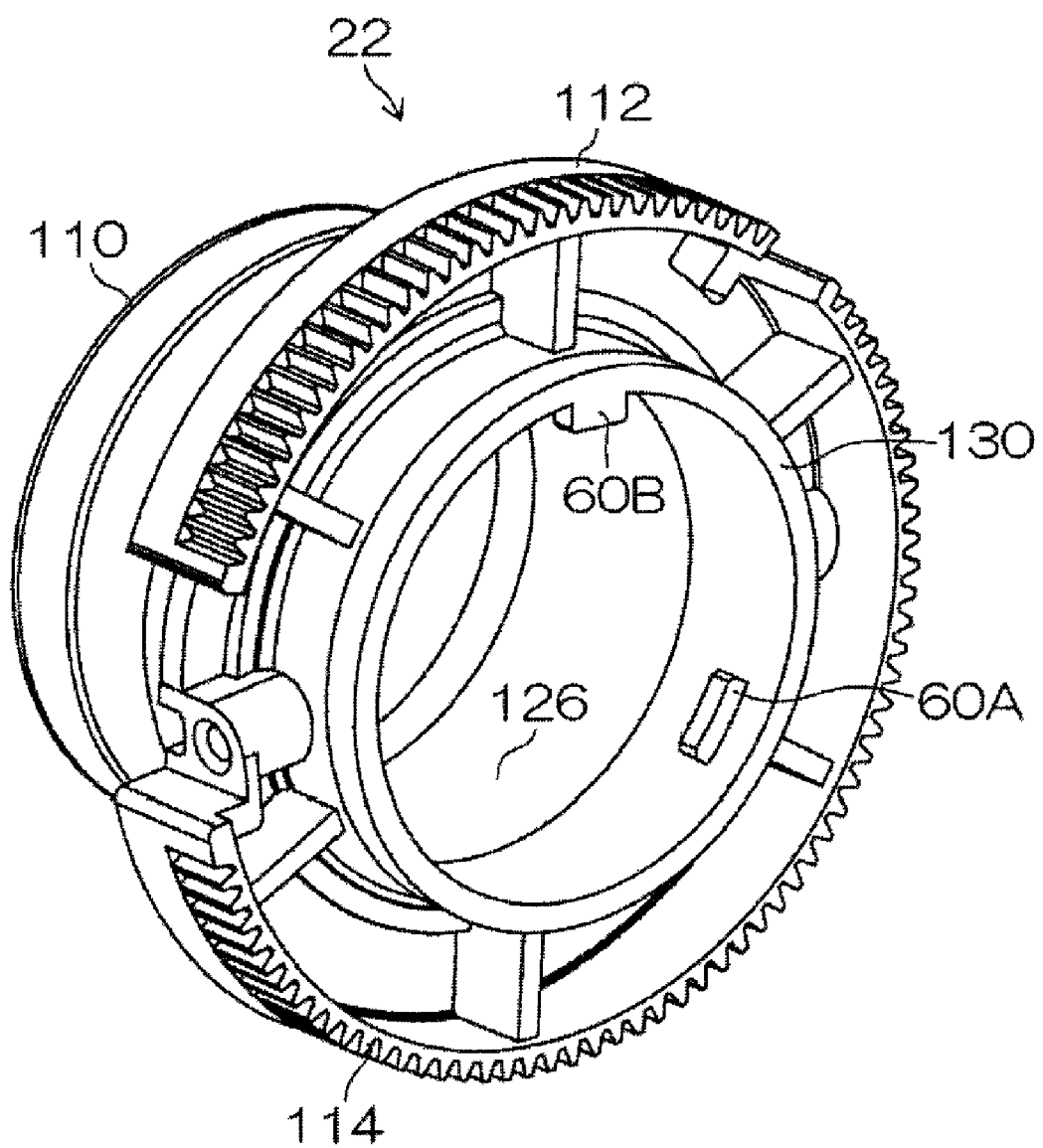
FIG. 5 is a perspective view illustrating a second rotating cylinder.
Figure 6:
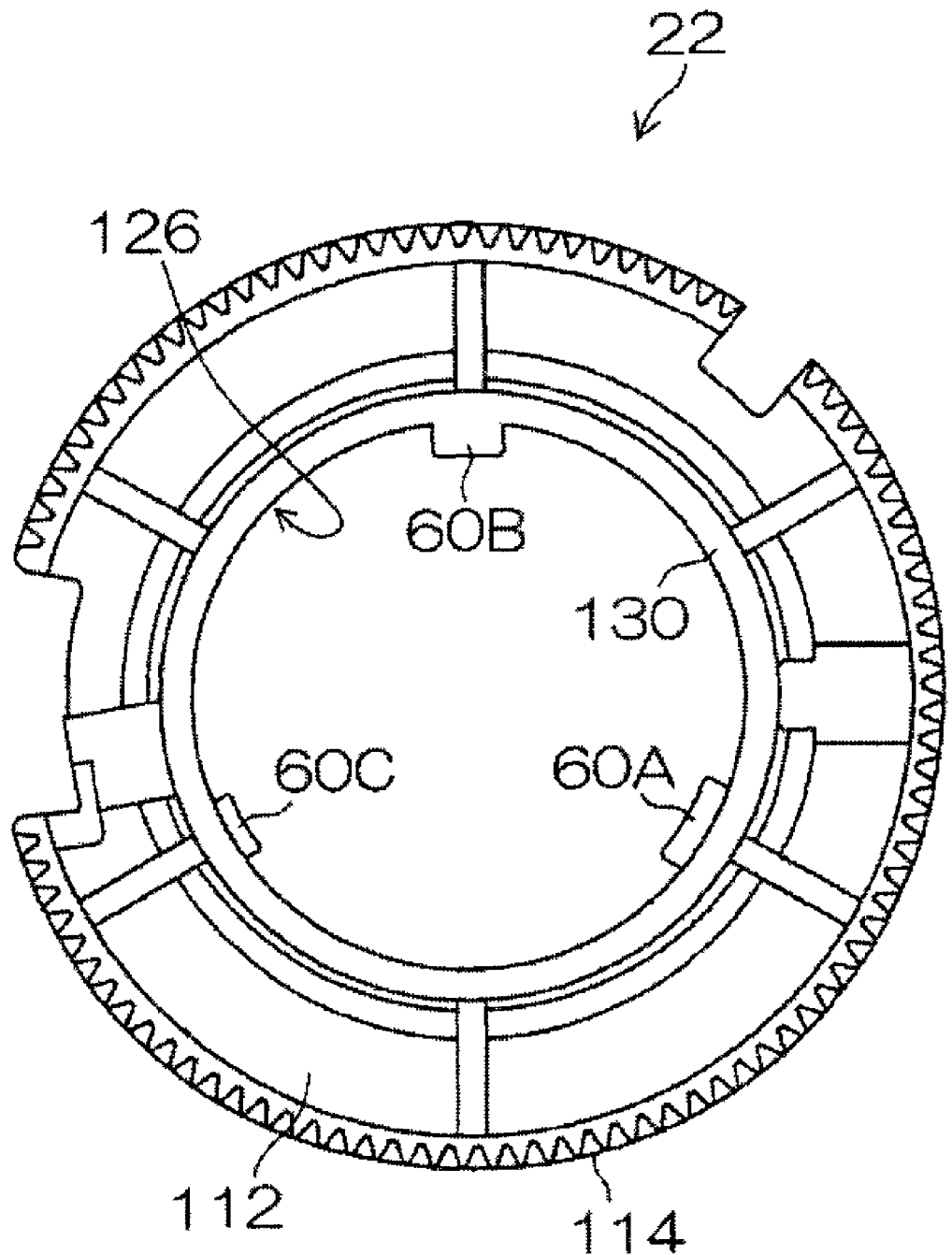
FIG. 6 is a plan view illustrating the second rotating cylinder.

FIG. 5 is a perspective view illustrating the second rotating cylinder 22, as viewed from the rear end surface 130, and FIG. 6 is a plan view illustrating the second rotating cylinder 22, as viewed from the rear end surface 130. The first claw portion 60A, the second claw portion 60B, and the third claw portion 60C shown in FIGS. 5 and 6 protrude from the inner circumferential surface 126 of the claw arrangement portion 112 and are provided at positions corresponding to the first guide groove 62A and the second guide groove 62B shown in FIGS. 3 and 4 in the axial direction.

That is, the first claw portion 60A and the third claw portion 60C fitted to the first guide groove 62A are provided on the inside (on a side close to the cam groove arrangement portion 110) of the second claw portion 60B fitted to the second guide groove 62B in the axial direction. The second claw portion 60B is provided on the rear end surface 130 of the claw arrangement portion 112.

The height of the second claw portion 60B (the amount of protrusion of the second claw portion 60B from the center of the inner circumference of the second rotating cylinder 22) is more than the heights of the first claw portion 60A and the third claw portion 60C, and the second claw portion 60B corresponds to the difference in depth between the first guide groove 62A and the second guide groove 62B. That is, the height of the second claw portion 60B is determined such that at least a portion of the leading end of the second claw portion 60B is fitted into the second guide groove 62B provided below the first guide groove 62A. According to this structure, it is possible to prevent the insertion of the second claw portion 60B from being fitted to the first guide groove 62A.

The first claw portion 60A has a height corresponding to the depth of the shallow portion of the first guide groove 62A, and the third claw portion 60C has a height corresponding to the depth of the deep portion of the first guide groove 62A.

That is, the first claw portion 60A and the third claw portion 60C have the following relationship: (the height of the first claw portion 60A)<(the height of the third claw portion 60C). The movement of the third claw portion 60C is regulated by a step portion 120 (see FIGS. 3 and 4) of the first guide groove 62A.

The width (the length in the circumferential direction) of the first claw portion 60A and the width of the third claw portion 60C correspond to the widths of the insertion portions 122A and 122B (see FIGS. 3 and 4), respectively. Therefore, the first claw portion 60A is inserted into the first guide groove 62A only from the insertion portion 122A, and the third claw portion 60C is inserted into the first guide groove 62A only from the insertion portion 122B. In addition, since the width of the second claw portion 60B corresponds to the width of the insertion portion 124, the second claw portion 60B is inserted into the second guide groove 62B only from the insertion portion 124.

According to this structure, it is possible to prevent an error in the insertion of the first to third claw portions 60A to 60C when the second fixed cylinder 18 and the second rotating cylinder 22 are fitted to each other and thus accurately determine the positions of the second fixed cylinder 18 and the second rotating cylinder 22.

When the second rotating cylinder 22 is fitted to the second fixed cylinder 18 having the above-mentioned structure, the first claw portion 60A is aligned with the insertion portion 122A, the second claw portion 60B is aligned with the insertion portion 124, and the third claw portion 60C is aligned with the insertion portion 122B. Then, the second rotating cylinder 22 is fitted from the rear side of the second fixed cylinder 18.

After the second rotating cylinder 22 is fitted to the second fixed cylinder 18, the second rotating cylinder 22 is rotated in the clockwise direction as viewed from the rear end surface 130 until the third claw portion 60C comes into contact with the step portion 120. This position is the attachment position of the fourth lens L4 and the fourth lens L4 is attached to the second fixed cylinder 18 to which the second rotating cylinder 22 is fitted.

A supporting member (not shown) is attached to the second fixed cylinder 18 having the fourth lens L4 accommodated therein from the rear side of the second rotating cylinder 22, thereby supporting the rear side of the second rotating cylinder 22 in the axial direction.

According to the attachment structure of the fourth lens L4 configured as described above, the first guide groove 62A and the second guide groove 62B are provided in the second fixed cylinder 18 at different positions in the axial direction, and the first claw portion 60A and the third claw portion 60C inserted into the first guide groove 62A and the second claw portion 60B inserted into the second guide groove 62B are provided at different positions in the axial direction so as to correspond to the first guide groove 62A and the second guide groove 62B. Therefore, it is possible to increase the lengths of the first guide groove 62A and the second guide groove 62B in the circumferential direction without any regulation therebetween. As a result, the operable range of the second rotating cylinder 22 is not regulated by the movement range of the first claw portion 60A and the third claw portion 60C inserted into the first guide groove 62A or the movement range of the second claw portion inserted into the second guide groove 62B, and it is possible to widen the operable range of the second rotating cylinder 22.

In addition, a step portion is provided between the first guide groove 62A and the second guide groove 62B, and the first claw portion 60A fitted to the first guide groove 62A and the second claw portion 60B fitted to the second guide groove 62B have different heights in the axial direction. Therefore, the insertion of the first to third claw portions 60A to 60C into the first guide groove 62A and the second guide groove 62B is prevented and the positions of the second fixed cylinder 18 and the second rotating cylinder 22 are reliably determined when they are fitted to each other. In addition, the detachment of the first to third claw portions 60A to 60C is prevented and a preferred operating feeling is obtained by an appropriate operation torque.

In this embodiment, the first claw portion 60A, the second claw portion 60B, and the third claw portion 60C are arranged on the inner circumferential surface 126 of the claw arrangement portion 112 at equal pitches of 120° in the circumferential direction. However, the pitches among the first claw portion 60A, the second claw portion 60B, and the third claw portion 60C may be appropriately changed. However, in order to uniformly receive the pressing force of the wavy spring 66, it is preferable that the first claw portion 60A, the second claw portion 60B, and the third claw portion 60C be arranged at equal intervals.

In this embodiment, three claw portions are provided. However, for example, the first claw portion 60A or the third pin may be omitted, or additional pins may be provided. In order to ensure the uniformity of the operation torque generated between the second fixed cylinder 18 and the second rotating cylinder 22, it is preferable that the number of pins be three or more and the three or more pins be arranged at equal intervals.

In this embodiment, three claw portions are inserted into two guide grooves (one of the two guide grooves is common to two claw portions). However, three claw portions may be inserted into three guide grooves.

As described above, the third lens L3 and the iris device 14 are attached to the front side of the second fixed cylinder 18 having the fourth lens L4 accommodated therein. The second fixed cylinder 18 is fitted to the first fixed cylinder 16 to which the first rotating cylinder 20 having the first lens L1 and the second lens L2 attached thereto is fitted. In this way, the lens device 10 for a monitoring camera is completed.

In this embodiment, the invention is applied to a lens device for a monitoring camera. However, the invention may be similarly applied to other lens devices.

What is claimed is:

1. A lens device comprising:
a moving lens that is fixed to a lens frame having a plurality of protruding portions provided on an outer circumferential portion thereof;
a barrel that has a cylindrical shape and includes a moving lens holding portion and a guide groove arrangement portion; and
a rotating cylinder that has a cylindrical shape corresponding to the barrel, is supported so as to be rotatable with respect to the barrel, and includes a cam groove arrangement portion and a claw arrangement portion,
wherein the moving lens holding portion includes straight-ahead grooves that correspond to the plurality of protruding portions and are provided in parallel to the axial direction so as to pass through the moving lens holding portion from an outer circumferential surface to the inside,
the protruding portions are fitted to the straight-ahead grooves from the inside to hold the moving lens such that the moving lens is movable along the axial direction,
the guide groove arrangement portion includes a first guide groove that is provided in the circumferential direction and a second guide groove that is provided in the circumferential direction so as to deviate from the first guide groove in the axial direction,
the cam groove arrangement portion includes cam grooves, which have a predetermined trajectory and to which the plurality of protruding portions protruding from the outer circumferential surface of the barrel are fitted, provided in the inner circumferential surface thereof,
the claw arrangement portion includes a first claw portion fitted to the first guide groove and a second claw portion fitted to the second guide groove, and
the first claw portion and the second claw portion are arranged at a predetermined interval in the circumferential direction such that they deviate from each other in the axial direction.

2. The lens device according to claim 1,
wherein the barrel has a structure in which the first guide groove and the second guide groove have different depths, and
the rotating cylinder has a shape in which the heights of the first claw portion and the second claw portion are different from each other so as to correspond to the depths of the first guide groove and the second guide groove.

3. The lens device according to claim 1,
wherein the barrel has a structure in which the length of the first guide groove and the second guide groove in the circumferential direction is more than the gap between the straight-ahead grooves.

4. The lens device according to claim 1,
wherein the rotating cylinder further includes a third claw portion that is provided substantially at the same position as the first claw portion in the axial direction, is arranged with a predetermined gap from the first claw portion and the second claw portion in the circumferential direction, and is fitted to the first rotation groove.

5. The lens device according to claim 4,
wherein the barrel has a structure in which the first guide groove has a step portion and portions of the first guide groove before and after the step portion have different depths, and
the rotating cylinder has a structure in which the heights of the first claw portion and the third claw portion are different from each other so as to correspond to the depth of the first guide groove.

6. The lens device according to claim 4,
wherein the rotating cylinder has a structure in which the first and second claw portions and the third claw portion are arranged substantially at equal intervals in the circumferential direction.

7. The lens device according to claim 1,
wherein a fixed lens is attached to the front side of the barrel such that the optical axis of the fixed lens is aligned with that of the moving lens.

8. The lens device according to claim 7,
wherein an iris device is attached to the front side of the fixed lens of the barrel.

9. The lens device according to claim 8,
wherein a second barrel having a structure in which a fixed lens is attached to the foremost surface and a moving lens is attached to the rear side of the fixed lens such that the optical axis of the moving lens is aligned with that of the fixed lens is attached to the front side of the iris device of the barrel.

* * * * *